(12) United States Patent
Kurosaki

(10) Patent No.: US 11,396,727 B2
(45) Date of Patent: Jul. 26, 2022

(54) DEODORANT-PAPER MANUFACTURING METHOD

(71) Applicant: CORELEX SHIN-EI CO., LTD., Fuji (JP)

(72) Inventor: Satoshi Kurosaki, Fuji (JP)

(73) Assignee: CORELEX SHIN-EI CO., LTD., Fuji (JP)

( * ) Notice: Subject to any disclaimer, the term of this patent is extended or adjusted under 35 U.S.C. 154(b) by 57 days.

(21) Appl. No.: 16/754,783

(22) PCT Filed: Dec. 10, 2018

(86) PCT No.: PCT/JP2018/045276
§ 371 (c)(1),
(2) Date: Apr. 9, 2020

(87) PCT Pub. No.: WO2019/131083
PCT Pub. Date: Jul. 4, 2019

(65) Prior Publication Data
US 2020/0318290 A1    Oct. 8, 2020

(30) Foreign Application Priority Data

Dec. 28, 2017 (JP) ............... JP2017-252976

(51) Int. Cl.
*D21H 23/50* (2006.01)
*D21H 21/14* (2006.01)
*D21H 27/00* (2006.01)

(52) U.S. Cl.
CPC .......... *D21H 23/50* (2013.01); *D21H 21/14* (2013.01); *D21H 27/00* (2013.01)

(58) Field of Classification Search
USPC ........................................ 162/135
See application file for complete search history.

(56) References Cited

U.S. PATENT DOCUMENTS

| | | | | |
|---|---|---|---|---|
| 4,024,015 A | * | 5/1977 | Kankaanpaa | D21F 9/046 162/203 |
| 4,038,452 A | * | 7/1977 | Kobayashi | D21H 15/04 442/357 |
| 2005/0098291 A1 | | 5/2005 | Kangas et al. | |
| 2006/0237157 A1 | * | 10/2006 | Zilker | D21F 9/043 162/208 |
| 2009/0001709 A1 | * | 1/2009 | Kretschmar | D21F 1/44 283/94 |
| 2009/0188638 A1 | | 7/2009 | Chalaye et al. | |
| 2014/0127413 A1 | | 5/2014 | Mcguire et al. | |
| 2017/0079280 A1 | | 3/2017 | Chen | |

FOREIGN PATENT DOCUMENTS

| | | |
|---|---|---|
| EP | 0856085 A1 | 8/1998 |
| EP | 2860312 A1 | 4/2015 |
| JP | 2002-282759 A | 10/2002 |
| JP | 2003-049396 A | 2/2003 |
| JP | 2003-071338 A | 3/2003 |
| JP | 2006-305469 A | 11/2006 |
| JP | 2006-316401 A | 11/2006 |
| JP | 2007-125464 A | 5/2007 |
| JP | 2008-106403 A | 5/2008 |
| JP | 2011-206189 A | 10/2011 |
| JP | 2014-034736 A | 2/2014 |
| JP | 2016-191175 A | 11/2016 |
| WO | 97/13036 A1 | 4/1997 |
| WO | 03/064766 A2 | 8/2003 |
| WO | 2013/018805 A1 | 2/2013 |
| WO | 2016/143217 A1 | 9/2016 |

OTHER PUBLICATIONS

International Search Report for PCT/JP2018/045276 dated Mar. 19, 2019 (PCT/ISA/210).
Extended European Search Report dated Jan. 25, 2021 from the European Patent Office in EP Application No. 18893786.6.

* cited by examiner

*Primary Examiner* — Mark Halpern
(74) *Attorney, Agent, or Firm* — Sughrue Mion, PLLC

(57) ABSTRACT

A deodorant-paper manufacturing method includes: a first step in which belt-like paper stock placed on a wire cloth in a wire part is dehydrated; a second step in which the dehydrated belt-like paper stock is transferred to conveyance means in a press part to be further dehydrated; and a third step in which the dehydrated belt-like paper stock is dried by drying means in a dryer part. Any one of the first to third steps includes a fourth step in which particle-containing liquid having deodorant effect is ejected from ejecting parts. In the fourth step, the ejecting parts are arranged in a line such that the particle-containing liquid is deposited in the width direction of the belt-like paper stock, and the particle-containing liquid is sequentially ejected from the ejecting parts with a predetermined time difference so that unevenness in or damage to fibers in the paper stock does not occur.

12 Claims, 6 Drawing Sheets

DEODORANT-PAPER MANUFACTURING METHOD

CROSS REFERENCE TO RELATED APPLICATIONS

This application is a National Stage of International Application No. PCT/JP2018/045276 filed Dec. 10, 2018, claiming priority based on Japanese Patent Application No. 2017-252976 filed Dec. 28, 2017.

TECHNICAL FIELD

The present disclosure relates to a method for manufacturing deodorant paper having deodorant effect.

BACKGROUND ART

Deodorant paper, which contains a deodorant agent or the like, is used to deodorize a place where the placing space is small, such as, for example, the inside of shoes, and garbage bags containing odor-producing waste.

An example of such deodorant paper is thin paper containing, for example, bincho-charcoal or activated-carbon particles, serving as a deodorant agent, which can be easily discarded as general waste, such as household garbage, after being used to absorb odor.

Example methods for manufacturing deodorant paper include: a method in which a deodorant agent is preliminarily mixed into a water-soluble polymer, and the mixture is transformed into a fibrous state and is made into paper; and a method in which a deodorant agent is added to slurry having pulp fibers or the like dispersed therein, and the slurry is made into paper. In another example method, slurry having a deodorant agent dispersed therein is deposited on thin paper by, for example, spraying, coating, padding, or dipping (for example, see Patent Literature 1).

An example of such deodorant paper is made of paper pulp fibers and a deodorant agent that is made of, for example, liquid squeezed from tea leaves or used tea leaves crushed into flakes (for example, see Patent Literature 2).

CITATION LIST

Patent Literature

[PTL 1] Japanese Unexamined Patent Application Publication No. 2003-49396
[PTL 2] Japanese Unexamined Patent Application Publication No. 2008-106403

SUMMARY OF INVENTION

Technical Problem

In the case where the pulp fibers and the deodorant agent are mixed together before being made into paper as described above, if, for example, the pulp fibers and carbon particles or the like having deodorant effect (deodorant agent) are mixed into white water, stirred, and then made into paper, a paper-stock defibration unit or the like, which handles the white water, among the apparatuses used to make paper, is soiled by the carbon particles or the like.

If the apparatus in this state continues to be operated, the gray color of the thin paper may become more intense than necessary. Hence, this apparatus needs to be cleaned as necessary to stabilize the quality of products.

Furthermore, the carbon particles and the pulp fibers mixed into the white water need to be sufficiently stirred to prevent unevenness of the deodorant effect. However, even when the stirring has been done like this, it has been difficult to accurately adjust or control the rate of the carbon particles added in papermaking, which has been a problem.

Furthermore, in coloring the paper fibers, pigment or color fixative is dissolved in or stirred with water or the like to make a liquid, and this liquid is splayed onto the paper fibers or the like in a wire part of a papermaking apparatus.

Also in the case where particles having deodorant effect are sprayed onto the paper fibers, the particles may be stirred in water or the like to make a liquid, and then this liquid may be sprayed onto the paper fibers. An example of such particles having deodorant effect is deodorant carbon particles that are not dissolved in water or the like.

If the carbon particles or the like stirred in water or the like are splayed in the wire part in the same way as the aforementioned coloring agent or the like, because the carbon particles have a certain hardness and because the paper fibers in finished paper contain certain moisture, the bonding between the paper fibers onto which the carbon particles or the like stirred in water are sprayed are likely to be deteriorated. Hence, for example, when the paper is rolled into a rolled product in the production process or when the paper is actually used, the thin paper is easily torn, which is a problem.

The present disclosure has been made in view of the above-described problem, and an object thereof is to provide a deodorant-paper manufacturing method in which thin paper is allowed to uniformly contain particles having deodorant effect at a desired rate and in which sufficient paper strength is ensured so that it is possible to maintain stable quality even in the form of a rolled product.

Solution to Problem

A deodorant-paper manufacturing method of the present disclosure includes: a first step in which belt-like paper stock that is made into paper and placed or deposited on conveyance means in a wire part is dehydrated; a second step in which the belt-like paper stock dehydrated in the first step is transferred to conveyance means in a press part to be further dehydrated; and a third step in which the belt-like paper stock dehydrated in the second step is dried by drying means in a dryer part. Any one of the first, second, and third steps includes a fourth step in which particle-containing liquid containing particles having deodorant effect is ejected from a plurality of ejecting parts. In the fourth step, the plurality of ejecting parts are arranged in a line such that the particle-containing liquid is deposited in the width direction of the belt-like paper stock, and the particle-containing liquid is sequentially ejected from the respective ejecting parts with a predetermined time difference so that unevenness in or damage to fibers in the paper stock does not occur.

Furthermore, in the fourth step, the particle-containing liquid is ejected sequentially from the ejecting part disposed at one end in the width direction of the paper stock toward the ejecting part disposed at the other end in the width direction of the paper stock.

Furthermore, in the fourth step, the particle-containing liquid is ejected sequentially from the ejecting part disposed at the central portion in the width direction of the paper stock toward the ejecting parts disposed at both ends in the width direction of the paper stock.

Furthermore, in the fourth step, the particle-containing liquid is ejected sequentially from the ejecting parts disposed at both ends in the width direction of the paper stock toward the ejecting part disposed at the central portion in the width direction of the paper stock.

Furthermore, in the first step, the paper stock is discharged from an inlet part onto a continuous mesh, serving as the conveyance means in the wire part, to make paper.

Furthermore, in the first step, the paper stock in a papermaking tank is formed into paper onto the conveyance means in the wire part by a cylinder mold.

Advantageous Effects of Invention

According to the present disclosure, it is possible to allow particles having deodorant effect to be deposited on paper stock at a desired rate and to produce thin deodorant paper while suppressing the occurrence of tearing or splitting.

DESCRIPTION OF EMBODIMENTS

An embodiment of the disclosure will be described below.

Example 1

Figure 1:
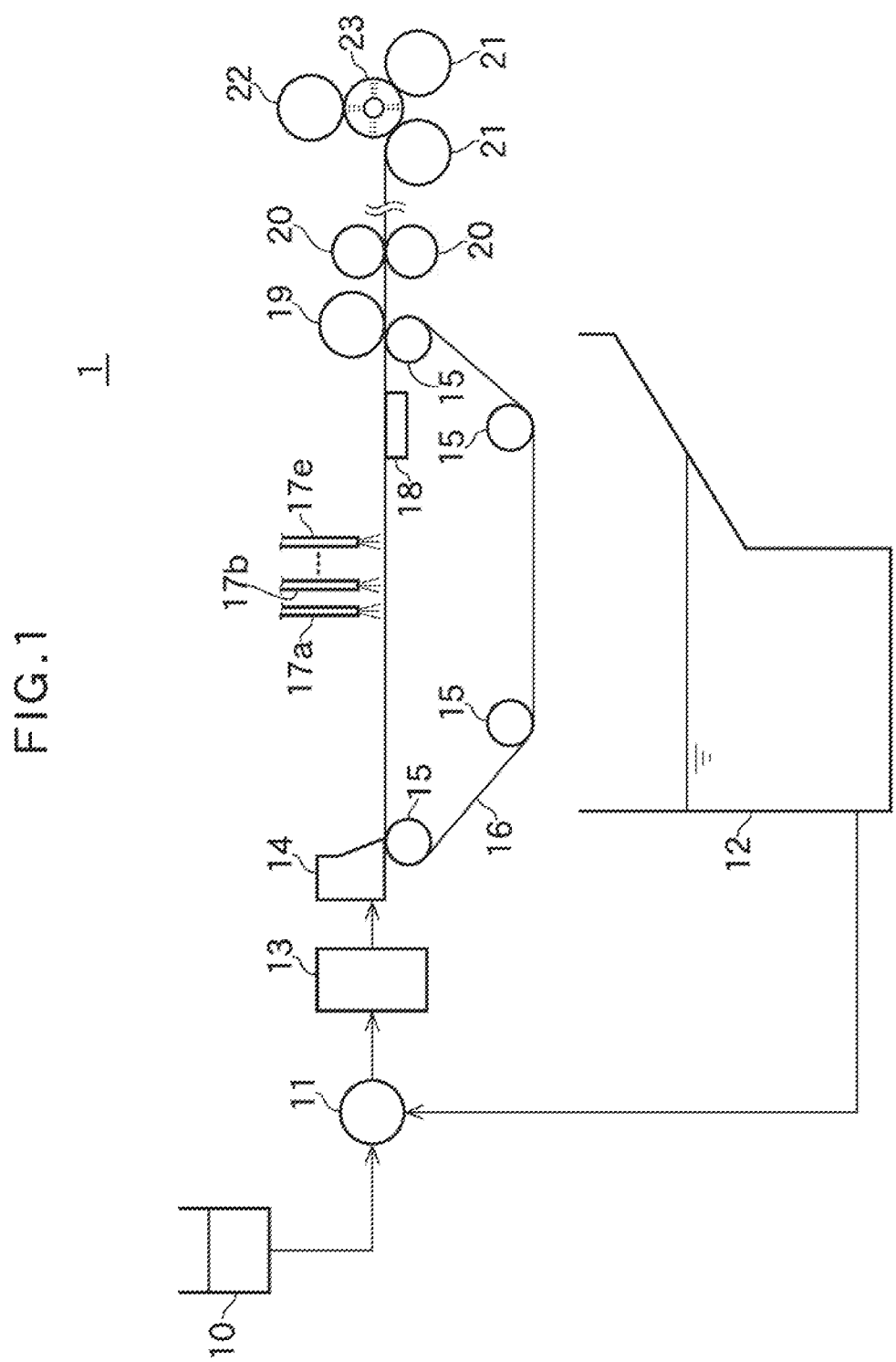
FIG. 1 is an explanatory diagram showing a schematic configuration of a papermaking apparatus that is used in a deodorant-paper manufacturing method according to Example 1 of the present disclosure.

FIG. 1 is an explanatory diagram showing a schematic configuration of a papermaking apparatus 1 that is used in a deodorant-paper manufacturing method according to Example 1 of the present disclosure. FIG. 1 shows a schematic arrangement of, mainly, a papermaking part (including a wire part) and a winding part of the papermaking apparatus 1, which is configured to make paper by using a continuous mesh, and the illustration of a dryer part and the like is omitted.

The papermaking apparatus 1 includes a pulp-material feeding unit 10 into which a pulp material or the like is supplied, a paper-stock defibration unit 11 in which the pulp material appropriately supplied from the pulp-material feeding unit 10 is defibrated and is mixed with white water to produce paper stock, and a white water pit 12 in which the white water is reserved.

The papermaking apparatus 1 also includes a screen part 13 that removes impurities from the paper stock produced by the paper-stock defibration unit 11, and an inlet part 14 from which the paper stock having passed through the screen part 13 is placed (discharged) on the top surface of wire cloth 16, together with the white water.

The papermaking apparatus 1 includes the papermaking part that uses the continuous mesh. The wire cloth 16 of the wire part of the papermaking apparatus 1 is formed as a ring-like continuous mesh. The wire cloth 16 is supported by a plurality of rollers 15 and is disposed so as to circulate along a ring-shaped path formed by the rollers 15. Conveyance means in the wire part of the papermaking apparatus 1 is formed of the wire cloth 16, the rollers 15, and the like. Note that, in FIG. 1, the illustration of a driving unit and the like that constitute the aforementioned conveyance means (that circulates the wire cloth 16) is omitted.

Furthermore, the wire cloth 16 of the papermaking apparatus 1 is disposed such that the upper part of the ring-shaped path moves from the inlet 14 side toward the couch roller 19 side.

The papermaking apparatus 1 also includes, for example, a particle-containing-liquid producing section (not shown) that produces particle-containing liquid, in which deodorant carbon particles are stirred in a liquid medium, such as water, and a plurality of ejecting parts 17a to 17e that eject the particle-containing liquid onto the paper stock formed on the wire cloth 16. Note that the number of the ejecting parts provided in the papermaking apparatus 1 is not limited to five, as shown as an example herein.

The papermaking apparatus 1 also includes, for example, a suction box 18, serving as a dehydrating unit, that removes moisture from the paper stock on which the particle-containing liquid has been deposited.

The papermaking apparatus 1 also includes a couch roller 19, serving as a press part for removing moisture from the paper stock, that presses the paper stock against moisture-absorbing felt (not shown), and press rollers 20 that apply pressure to the paper stock to form continuous (belt-like) thin paper.

The papermaking apparatus 1 also includes a dryer part (not shown) for drying the thin paper having passed through the press rollers 20 and the like. The papermaking apparatus 1 also includes, for example, winding rollers 21, a winding pressure roller 22, and the like (the aforementioned winding part), which roll the belt-like thin paper having passed through the dryer part into a roll shape to form deodorant rolled paper 23.

Next, the operation will be described.

When producing deodorant paper by using the papermaking apparatus 1, for example, a pulp material or the like is supplied to the pulp-material feeding unit 10 in advance, and a predetermined amount of the pulp material is successively fed to the paper-stock defibration unit 11. The white water reserved in the white water pit 12 is supplied to the paper-stock defibration unit 11.

The paper-stock defibration unit 11 mixes the white water supplied from the white water pit 12 and the pulp material supplied from the pulp-material feeding unit 10 to produce the paper stock and feeds the paper stock to the screen part 13.

The screen part 13 performs treatment for removing substances and the like unnecessary for making paper from the paper stock obtained from the paper-stock defibration unit 11 to produce the paper stock to be eventually formed into thin paper and feeds the paper stock to the inlet 14.

The inlet 14 successively discharges the paper stock onto the top surface of the wire cloth 16, together with the white water. Once the paper stock is placed (or deposited) on the top surface of the successively moving wire cloth 16, only the white water drops into the white water pit 12 from the wire cloth 16. Herein, because the inlet 14 places the paper stock on the moving wire cloth 16 as described above, the paper stock is continuously placed in the form of a belt (elongated shape).

Figure 2:
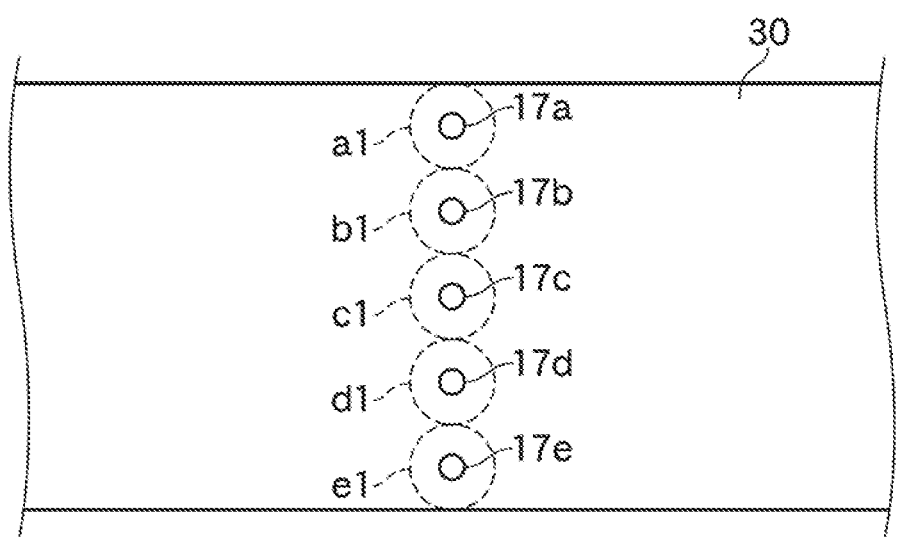
FIG. 2 is an explanatory diagram showing an arrangement configuration of ejecting parts of the papermaking apparatus in FIG. 1.

FIG. 2 is an explanatory diagram showing an arrangement configuration of the ejecting parts 17a to 17e of the papermaking apparatus 1 in FIG. 1. FIG. 2 shows paper stock 30 placed on the wire cloth 16 in FIG. 1, as viewed from above, and shows an arrangement configuration of the ejecting parts 17a to 17e that eject the particle-containing liquid onto the paper stock 30.

In the papermaking apparatus 1 as shown herein as an example, the ejecting parts 17a to 17e are arranged in a line so as to be perpendicular to the moving direction of the wire cloth 16; in other words, in a straight line extending in the width direction of the belt-like paper stock 30 placed on the wire cloth 16.

Note that the ejecting parts 17a to 17e are piped and connected such that the particle-containing liquid is supplied from the particle-containing-liquid producing section. Furthermore, the ejecting parts 17a to 17e are connected to an ejection control unit or the like (not shown) that controls the ejection operation such that an appropriate amount of the particle-containing liquid is ejected at predetermined timing.

The ejecting parts 17a to 17e are disposed so as to eject or spray the particle-containing liquid downward. As shown in FIG. 2, the ejecting part 17a, the ejecting part 17b, the ejecting part 17c, the ejecting part 17d, and the ejecting part 17e are securely arranged so as to eject the particle-containing liquid onto a deposition area a1, a deposition area b1, a deposition area c1, a deposition area d1, and a deposition area e1, respectively.

The deposition areas a1 to e1 are provided so as to be continuous between both ends in the width direction of the belt-like paper stock 30 placed on the wire cloth 16 and are provided such that there is no gap between the particle-containing-liquid deposited portions.

The paper stock 30 placed on the top surface of the wire cloth 16 from the inlet 14 as described above reaches below the ejecting parts 17a to 17e as the wire cloth 16 moves.

The paper stock 30 that has reached below the ejecting parts 17a to 17e is in the middle of the wire part constituting the papermaking apparatus 1 and contains a certain amount of moisture to be drained in the future. If the particle-containing liquid is ejected onto the paper stock 30 in this state, the paper stock 30 will be in a state in which a large amount of moisture is soaked into the fibers.

More specifically, the distances between the fibers increase due to the soaked moisture, leading to a state in which the fibers are easily broken or torn.

Furthermore, for example, when the ejecting part 17a ejects the particle-containing liquid, the ejection force is maximum at the central position thereof. Hence, the particle-containing liquid is ejected with the maximum force at the central position of the deposition area a1, the moisture at this part sharply increases, and the moisture diffuses due to soaking as described above. Also in the deposition areas b1 to d1, the moisture sharply increases at the central positions, and the moisture diffuses from these portions due to soaking.

If the moisture sharply increases and diffuses by soaking in this manner, the fibers in the paper stock 30 tend to become uneven.

Hence, to suppress damage to and unevenness in the fibers in the paper stock 30, in the papermaking apparatus 1, the particle-containing liquid is ejected from the ejecting parts 17a to 17e at different timing to prevent the moisture content in the paper stock 30 from sharply increasing.

The ejection control unit mentioned above causes, for example, the ejecting part 17a to perform a first particle-containing-liquid ejection operation and then the ejecting part 17b to perform an ejection operation with a predetermined time difference. In the same way, the ejecting parts 17c to 17e are caused to sequentially perform ejection operations with a predetermined time difference.

In other words, the particle-containing liquid is sequentially ejected from the ejecting part 17a, which is located at one end in the width direction of the paper stock 30, toward the ejecting part 17e, which is located at the other end of the paper stock 30.

Note that, for example, although the ejection of the particle-containing liquid by the ejecting part 17a is performed intermittently, the ejection operations of the ejecting part 17a are performed at time intervals such that the deposition areas a1 are continuous in the longitudinal direction (moving direction of the wire cloth 16) as a result of the belt-like paper stock 30 being moved by the wire cloth 16. Similarly, the ejection operations of the ejecting parts 17b to 17e are also performed such that the deposition areas b1 to e1 are continuous in the longitudinal direction.

Herein, as described above, the paper stock 30 placed on the wire cloth 16 contains moisture, and the particle-containing liquid deposited thereon also contains moisture.

Hence, the moisture in the particle-containing liquid is mixed with the moisture in the paper stock 30 and is quickly soaked into the fibers in the paper stock 30.

When there is some unevenness in the particle-containing-liquid deposition areas, that is, when there are gaps (undeposited portions) in the deposition areas to which the particle-containing liquid has been ejected, the particle-containing liquid diffuses by soaking, thus eliminating the gaps.

Specifically, as a result of the moisture soaking as described above, the deodorant carbon particles or the like contained in the particle-containing liquid diffuses through the fibers in the paper stock 30. Hence, the paper stock 30 on which the particle-containing liquid from the ejecting parts 17a to 17e is deposited is the paper stock 30 in which the deodorant carbon particles or the like are deposited on the entirety thereof or in which the deodorant carbon particles or the like are allowed to be contained between the fibers.

In other words, in the papermaking apparatus 1, the ejecting parts 17a to 17e are disposed at positions where it is possible to allow an appropriate amount of the particle-containing liquid to be deposited on the paper stock 30 that is in a state of containing an appropriate amount of moisture after being drained as described above.

The aforementioned ejection control unit controls the ejection intervals at the ejecting parts 17a to 17e and the amount of the particle-containing liquid ejected such that the deodorant carbon particles or the like are deposited on or allowed to be contained in the entirety of the paper stock 30 through soaking (liquid bleeding) as described above, even if there are gaps between the deposition areas to which the particle-containing liquid has been ejected. Note that it is also possible to perform control such that the particle-containing liquid is sequentially ejected from the ejecting part 17e toward the ejecting part 17a.

Furthermore, it is also possible to perform control such that ejection of the particle-containing liquid is started from the ejecting part 17c, which is disposed at the central portion in the width direction of the paper stock 30 placed on the wire cloth 16, toward each of the ejecting part 17a and the ejecting part 17e, which are disposed at both ends in the width direction, that is, the ejecting parts arranged in a straight line are caused to sequentially eject the particle-containing liquid in two directions.

Furthermore, it is also possible to perform control such that ejection of the particle-containing liquid is started from the ejecting part 17a and the ejecting part 17e, which are disposed at both ends in the width direction of the paper stock 30 placed on the wire cloth 16, toward the ejecting part 17c, which is located at the central portion in the width direction, that is, the ejecting parts arranged in a straight line are caused to sequentially eject the particle-containing liquid from two directions.

Figure 3:
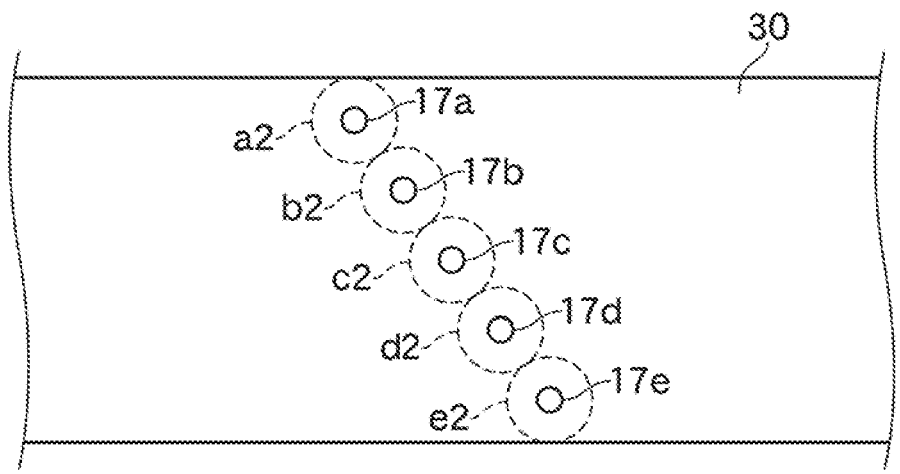
FIG. 3 is an explanatory diagram showing another arrangement configuration of the ejecting parts provided in the papermaking apparatus in FIG. 1.

FIG. 3 is an explanatory diagram showing another arrangement configuration of the ejecting parts 17a to 17e provided in the papermaking apparatus 1 in FIG. 1. Similarly to FIG. 2, FIG. 3 shows the paper stock 30 placed on the wire cloth 16 as viewed from above and shows another arrangement configuration of the ejecting parts 17a to 17e, which eject the particle-containing liquid onto the paper stock 30. Herein, the ejecting part 17a, the ejecting part 17b, the ejecting part 17c, the ejecting part 17d, and the ejecting part 17e are securely arranged so as to eject the particle-containing liquid onto a deposition area a2, a deposition area b2, a deposition area c2, a deposition area d2, and a deposition area e2, respectively.

The ejecting parts 17a to 17e shown in FIG. 3 are arranged in a straight line above the top surface of the wire cloth 16 and are arranged such that the straight-line row of the ejecting parts 17a to 17e has a predetermined angle with respect to the traveling direction of the wire cloth 16.

In other words, the ejecting parts 17a to 17e are securely disposed so as to be in a line having a predetermined angle with respect to the width direction of the belt-like paper stock 30 placed on the wire cloth 16 and are arranged such that the deposition areas a2 to e2 are formed in a line in the width direction of the paper stock 30 when the ejecting parts 17a to 17e eject the particle-containing liquid while the wire cloth 16 or the paper stock 30 is moving.

Also in the case where the particle-containing liquid is ejected from the ejecting parts 17a to 17e arranged in this manner onto the deposition areas a2 to e2, respectively, the particle-containing liquid diffuses due to soaking as described above, and the paper stock 30 having the deodorant carbon particles or the like deposited on the entirety thereof is produced.

Also in a configuration in which the ejecting parts 17a to 17e are arranged as shown in FIG. 3, similarly to the ejection operation described with respect to the ejecting parts 17a to 17e shown in FIG. 2, the ejection control unit or the like controls the ejection operation, and the particle-containing liquid is ejected from the respective ejecting parts in the order described above.

Arranging the ejecting parts 17a to 17e as shown in FIG. 3 makes it possible to increase the straight-line distance between the ejecting parts and to reduce the distance between (the central portions of) the deposition areas in the width direction of the paper stock 30.

Specifically, by increasing the (straight-line) distance between the particle-containing-liquid ejection positions, unevenness of and damage (tearing) to the fibers are suppressed, and, by bringing the deposition areas closer to each other in the width direction of the paper stock 30, the accuracy of uniformly depositing the particle-containing liquid increases. Hence, it is possible to stabilize the quality, such as deodorant effect and the like, when thin paper is formed.

After the particle-containing liquid is ejected from the ejecting parts 17a to 17e and is deposited on the paper stock 30 as described above while the wire cloth 16 is being moved, the paper stock 30 reaches the position where the suction box 18 is provided, as the wire cloth 16 moves further.

The papermaking apparatus 1 actuates the suction box 18 to remove the moisture from the paper stock 30 that moves, for example, above the suction box 18. Next, the paper stock 30 that has passed through the suction box 18 is pressed against felt with the couch roller 19 to be dehydrated (above-described moisture absorbing) and is brought into contact with the plurality of press rollers 20 to be formed in dehydrated paper stock or thin paper.

Thereafter, the belt-like thin paper successively fed out of the press rollers 20 is conveyed to the dryer part (not shown) to be completely dried. Furthermore, for example, the continuous thin paper that has been dried in the dryer part is supplied to the winding rollers 21, the winding pressure roller 22, or the like, where it is rolled into the deodorant rolled paper 23 that is formed of thin paper containing the deodorant carbon particles or the like.

Example 2

Figure 4:
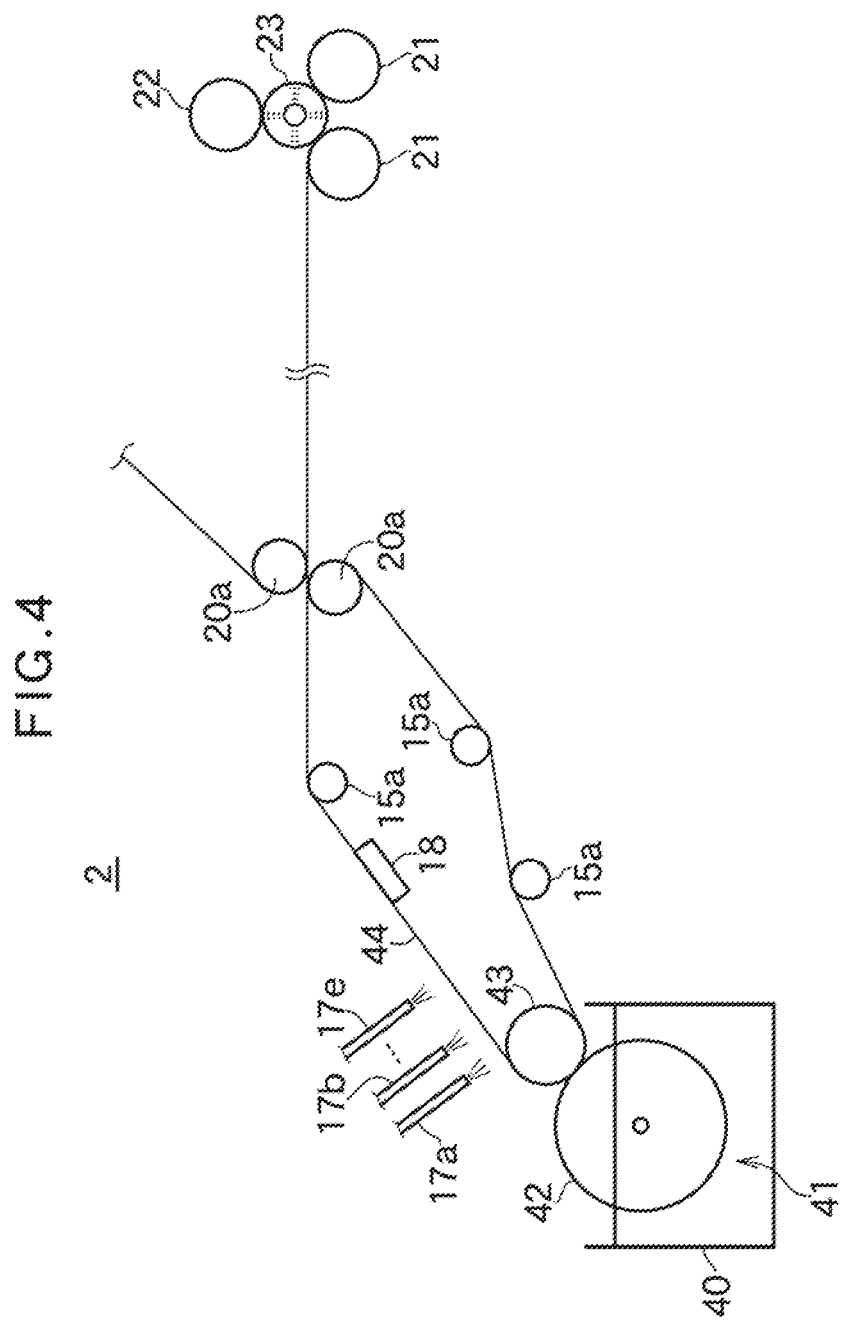
FIG. 4 is an explanatory diagram showing a schematic configuration of a paper making apparatus according to Example 2 of the present disclosure.

FIG. 4 is an explanatory diagram showing a schematic configuration of a production apparatus 2 according to Example 2 of the present disclosure. FIG. 4 shows a schematic arrangement of, mainly, the papermaking part and the winding part of the papermaking apparatus 2 that is configured to make paper using a cylinder mold. In FIG. 4, the illustration of the press part, the dryer part, and the like is omitted.

Note that, herein, overlapping explanations of portions that are the same as or correspond to the portions (configuration and operation) of the papermaking apparatus 1 in Example 1 will be omitted, and the configurations, operations and the like that are characteristic to the papermaking apparatus 2 in Example 2 will be described.

The papermaking apparatus 2 is configured to operate in accordance with the deodorant-paper manufacturing method of the present disclosure and includes a papermaking part that uses a cylinder mold. The other parts and the like have the same configurations as those of the papermaking apparatus 1. The papermaking part of the papermaking apparatus 2 includes a papermaking tank 40 that is open at the top and that stores paper stock liquid 41, which is, for example, mixture of a defibrated pulp material and white water. The papermaking apparatus 2 also includes a cylindrical cylinder 42 (cylinder mold) that is partially under the paper stock liquid 41 stored in the papermaking tank 40 and that scoops up the paper stock 30 (not shown) contained in the paper stock liquid 41.

The cylindrical cylinder 42 is connected to a rotation driving unit or the like (not shown) that rotates the cylindrical cylinder 42 about the central axis of the cylinder. The cylindrical cylinder 42 is disposed such that the paper stock 30 is continuously deposited on the side-surface portion of the cylinder (circumferential surface) as the cylindrical cylinder 42 is rotated and such that the cylindrical cylinder 42 scoops up the paper stock 30 to a position above the liquid surface in the papermaking tank 40.

Furthermore, the papermaking part of the papermaking apparatus 2 includes, for example, wet felt 44 or the like, serving as the conveyance means in the wire part that conveys the paper stock 30 scooped up by the cylindrical cylinder 42.

The wet felt 44 is made of a belt-like material having a water-absorbing or water-squeezing property, which is formed in a ring shape. The wet felt 44 is stretched over a plurality of rollers 15a, a couch roller 43, press rollers 20a, and the like and is supported so as to circulate.

In the papermaking apparatus 2, the wet felt 44 is disposed so as to circulate along a ring-shaped path formed of these rollers and the like, thus forming the conveyance means in the wire part. Similarly to the papermaking apparatus 1, the conveyance means in the wire part of the papermaking apparatus 2 is also configured to have the suction box 18 at an appropriate position to dehydrate the paper stock 30 adhered to the wet felt 44.

Note that, in FIG. 4, the illustration of a driving unit or the like for circulating the wet felt 44 is omitted.

The couch roller 43 is disposed so as to bring the surface of the wet felt 44, wound on the couch roller 43, into contact with a portion of the cylindrical cylinder 42 (one portion of the circumferential surface) projecting from the liquid surface in the papermaking tank 40.

The wet felt 44 is disposed so as to be in contact with a belt-like dry felt constituting conveyance means in the press part, at, for example, a position where the press rollers 20a is disposed.

As described above, the wet felt 44 is in contact with the cylindrical cylinder 42 and allows the paper stock 30 scooped up by the cylindrical cylinder 42 to adhere to its own surface. At this time, as a result of the wet felt 44 circulating in response to the rotation of the cylindrical cylinder 42, the paper stock 30 adheres to the surface of the wet felt 44 so as to be continuous in a belt-like shape (elongated shape).

Note that it is also possible to configure the apparatus such that a plurality of papermaking tanks 40, cylindrical cylinders 42, and the like are disposed in a line, and the wet felt 44 comes into contact with the respective cylindrical cylinders 42 to make paper from the respective papermaking tanks 40.

Furthermore, in the papermaking apparatus 2, the ejecting parts 17a to 17e are disposed, for example, near the couch roller 43, that is, at a position downstream of the position where the cylindrical cylinder 42 makes paper from the papermaking tank 40 (a position to which, after the paper stock 30 that has been made into paper by the cylindrical cylinder 42 is adhered to the wet felt 44, the wet felt 44 having the paper stock 30 adhered thereto reaches) and eject the particle-containing liquid onto the paper stock 30 adhered to the surface of the wet felt 44.

Note that the ejecting parts 17a to 17e provided in the papermaking apparatus 2 are securely arranged in a line as those provided in the papermaking apparatus 1, that is, as shown in FIG. 2 or 3. Furthermore, the papermaking apparatus 2 includes an ejection control unit or the like similar to that in the papermaking apparatus 1, and the ejection control unit controls the ejecting parts 17a to 17e so as to eject the particle-containing liquid.

The particle-containing liquid used in the papermaking apparatus 2 is the same as that used in the papermaking apparatus 1. Furthermore, also in the papermaking apparatus 2, the operation of ejecting the particle-containing liquid from the ejecting parts 17a to 17e onto the paper stock 30 adhered to the surface of the wet felt 44 is performed in the same way as the ejection operation performed in the papermaking apparatus 1 described using FIGS. 2 and 3.

After the particle-containing liquid has been ejected onto the paper stock 30 adhered to the circulating wet felt 44 as described above, the paper stock 30 is, as the wet felt 44 moves, nipped between the two press rollers 20a constituting the press part, together with, for example, the aforementioned dry felt, and is transferred from the wet felt 44 to the dry felt by adhesion.

Thereafter, the paper stock 30 is conveyed to the dryer part (not shown) by the conveyance means in the press part (the dry felt or the like), where it is completely dry belt-like thin paper, as in the papermaking apparatus 1, and is made into the deodorant rolled paper 23 by the winding rollers 21, the winding pressure roller 22, and the like.

Example 3

Figure 5:
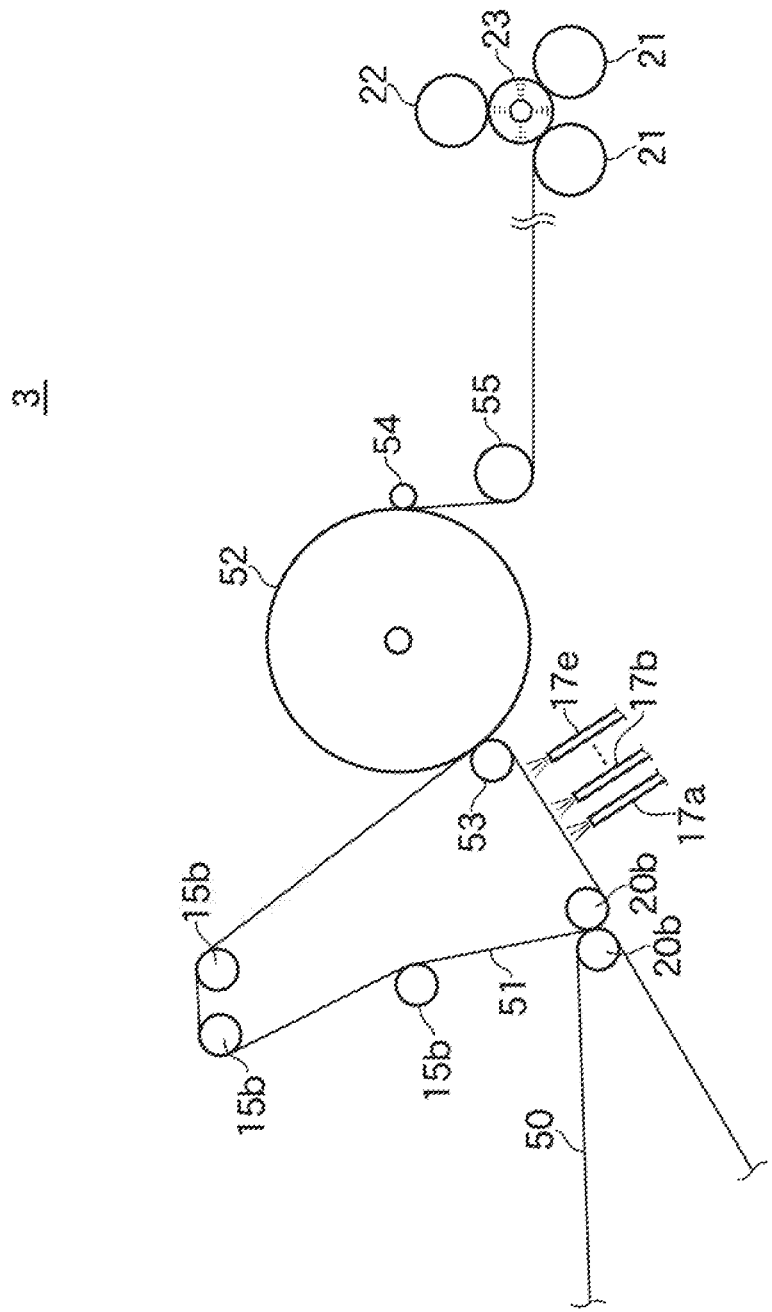
FIG. 5 is an explanatory diagram showing a schematic configuration of a paper making apparatus according to Example 3 of the present disclosure.

FIG. 5 is an explanatory diagram showing a schematic configuration of a production apparatus 3 according to Example 3 of the present disclosure. FIG. 5 shows a schematic configuration of the press part, the dryer part, and the winding part of the production apparatus 3 that is configured to operate in accordance with the deodorant-paper manufacturing method of the present disclosure. In FIG. 5, the illustration of the other parts are omitted.

The production apparatus 3 includes, in the press part, the ejecting parts 17a to 17e that eject the particle-containing liquid, and the papermaking part (wire part) and the like, which are not shown in FIG. 5, have configurations shown in, for example, FIG. 1 or 4 without the ejecting parts 17a to 17e and the like.

The press part in the papermaking apparatus 3 includes dry felt 51 that is supported by, for example, a plurality of rollers 15b. The dry felt 51 is formed of a belt-like material having a water-absorbing property (water-squeezing property) and is formed in a ring shape. The dry felt 51 is disposed so as to be circulated by, for example, a driving unit or the like (not shown) along a ring-shaped path formed by the rollers 15b and the like.

The ring-like dry felt 51 is stretched over the rollers 15b and press rollers 20b. The ring-like dry felt 51 is disposed so as to be nipped between the two press rollers 20b, together with the wet felt 50 that constitutes, for example, conveyance means in the papermaking part. At this portion, the belt-like (elongated) paper stock 30 adhered to the wet felt 50 is peeled off and is successively caused to adhere to the dry felt 51. Note that the wet felt 50 is similar to the wet felt 44 provided in the papermaking apparatus 2 and is configured to be stretched over the rollers and circulated by driving means (not shown).

The dry felt 51 is stretched over the aforementioned rollers 15b, the press rollers 20b, and a pressure roller 53 which brings a portion to which the paper stock 30 is adhered into contact with a Yankee drum 52, thus forming conveyance means in the press part of the papermaking apparatus 3.

The Yankee drum 52, which constitutes drying means in the dryer part, is provided so as to be rotationally driven by a driving unit or the like (not shown).

A scraper 54 for peeling off the paper stock 30 adhered to the Yankee drum 52 (thin paper dried by the Yankee drum 52) is provided on the circumference of the Yankee drum 52, at a position sufficiently distant from the aforementioned position at which the Yankee drum 52 is in contact with the pressure roller 53.

The papermaking apparatus 3 includes a roller 55, which guides the thin paper peeled off by the scraper 54 to a winding part (the winding rollers 21, the winding pressure roller 22, and the like described below), the winding rollers 21, the winding pressure roller 22, and the like that roll the thin paper in a roll shape to form the deodorant rolled paper 23.

Note that, although example drying means in the dryer part described herein is the Yankee drum 52, to the circumferential surface of which the paper stock 30 is adhered, the papermaking apparatus 3 may include another type of drying means, and, for example, drying means configured to dry the paper stock 30 that is being conveyed by conveyance means or the like may be used.

The papermaking apparatus 3 includes, in the press part, the ejecting parts 17a to 17e and is configured to eject the particle-containing liquid onto the belt-like paper stock 30 adhered to the dry felt 51.

The ejecting parts 17a to 17e are disposed, for example, between the position where the press rollers 20b, which allow the paper stock 30 to adhere to the dry felt 51, are disposed and the position where the pressure roller 53, which peels off the paper stock 30 from the dry felt 51 and transfers the paper stock 30 to the Yankee drum 52, is disposed so as to eject the particle-containing liquid to the dry felt 51 that moves between these rollers. At this position, the ejecting parts 17a to 17e are arranged, for example, in a line as shown in FIG. 2 or 3, with respect to the belt-like paper stock 30 adhered to the dry felt 51.

The papermaking apparatus 3 includes an ejection control unit or the like (not shown) similar to that provided in the papermaking apparatuses 1 and 2, and the ejection control unit or the like is configured to control the operation of the ejecting parts 17a to 17e disposed between the press rollers 20b and the pressure roller 53.

Note that the ejection operation of the ejecting parts 17a to 17e provided in the papermaking apparatus 3 is performed in the same way as the ejection operation performed in the papermaking apparatus 1, described using FIGS. 2 and 3, by the control performed by the ejection control unit. Furthermore, the particle-containing liquid used in the papermaking apparatus 3 is the same as that used in the papermaking apparatus 1 or the like.

After the particle-containing liquid has been ejected onto the belt-like paper stock 30 adhered to the circulating dry felt 51 as described above, the paper stock 30 moves from the dry felt 51 to the circumferential surface of the Yankee drum 52 by adhesion, at the position where the moving pressure roller 53 is disposed.

The paper stock 30, which has moved from the press part to the dryer part as described above, is made into completely dry belt-like thin paper by the Yankee drum 52. After being peeled off from the Yankee drum 52, this belt-like paper is formed into the deodorant rolled paper 23 by the winding rollers 21, the winding pressure roller 22, and the like, as in the papermaking apparatus 1 or the like.

Example 4

Figure 6:
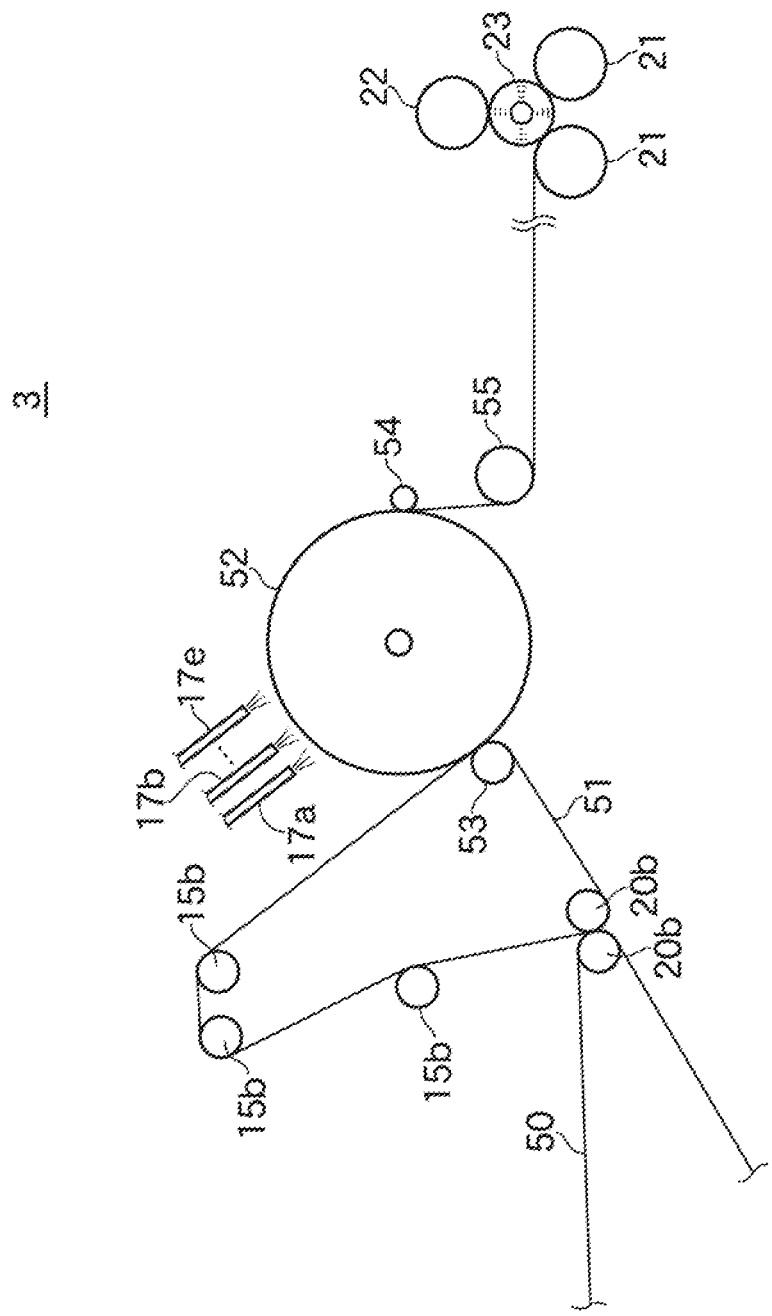
FIG. 6 is an explanatory diagram showing a schematic configuration of a papermaking apparatus according to Example 4 of the present disclosure.

FIG. 6 is an explanatory diagram showing a schematic configuration of a papermaking apparatus 4 according to Example 4 of the present disclosure. FIG. 6 shows schematic configurations of the press part, the dryer part, and the winding part of the production apparatus 4 configured to operate in accordance with the deodorant-paper manufacturing method of the present disclosure, and the illustration of other parts is omitted.

The papermaking apparatus 4 includes, in the dryer part, the ejecting parts 17a to 17e, which eject the particle-containing liquid, and the papermaking part and the like, which are not shown in FIG. 6, have configurations shown in, for example, FIG. 1 or 4 without the ejecting parts 17a to 17e and the like.

The dryer part of the papermaking apparatus 4 includes, for example, the Yankee drum 52, serving as means for drying the paper stock 30 that has passed through the wire part and the press part. The Yankee drum 52 is configured to be rotationally driven by a driving unit or the like (not shown), similarly to that described using FIG. 3.

The Yankee drum 52 is, on the circumference of the Yankee drum 52, in contact with, for example, the dry felt 51 of the press part and is disposed such that the belt-like paper stock 30 adhered to the dry felt 51 is peeled off and is caused to adhere to the circumferential surface of the Yankee drum 52.

More specifically, in the press part of the papermaking apparatus 4, the ring-like dry felt 51 is stretched over the plurality of rollers 15b, the press rollers 20b, and the pressure roller 53, as in the one shown in, for example, FIG. 3. The dry felt 51 is brought into contact with a predetermined position of the Yankee drum 52 by the pressure roller 53.

Furthermore, in the dryer part of the papermaking apparatus 4, the scraper 54 for peeling off the paper stock 30 adhered to the Yankee drum 52 (thin paper dried by the Yankee drum 52) is provided on the circumference of the Yankee drum 52, at a position sufficiently distant from the aforementioned position at which the Yankee drum 52 is in contact with the pressure roller 53.

Similarly to the papermaking apparatus 3, the papermaking apparatus 4 includes the roller 55, which guides the belt-like thin paper peeled off by the scraper 54 to the winding part (the winding rollers 21, the winding pressure roller 22, and the like described below), the winding rollers 21, the winding pressure roller 22, and the like that roll the thin paper in a roll shape to form the deodorant rolled paper 23.

Note that, although example drying means in the dryer part described herein is the Yankee drum 52, to the circumferential surface of which the paper stock 30 is adhered, the papermaking apparatus 4 may include another type of drying means, and, for example, drying means configured to dry the paper stock 30 that is being conveyed by conveyance means or the like may be used.

The ejecting parts 17a to 17e provided in the dryer part of the papermaking apparatus 4 are disposed, for example, between the position where the circumferential surface of the Yankee drum 52 is in contact with the press part or dry felt 51 and the position where the scraper 54 is disposed on the circumferential surface of the Yankee drum 52.

Specifically, the ejecting parts 17a to 17e are disposed so as to face a portion on the circumferential surface of the Yankee drum 52 to which the paper stock 30 is adhered. In other words, the ejecting parts 17a to 17e are disposed in an area in which the paper stock 30 that has been transferred from the dry felt 51 to the circumferential surface of the Yankee drum 52 moves as the Yankee drum 52 rotates.

Furthermore, the ejecting parts 17a to 17e are disposed such that the particle-containing liquid is deposited on the paper stock 30, for example, before the paper stock 30 adhered to the circumferential surface of the Yankee drum 52 is completely dried.

Furthermore, the papermaking apparatus 4 includes an ejection control unit similar to one provided in the papermaking apparatus 1 or the like, and the ejection control unit is configured to control the ejection operation of the ejecting parts 17a to 17e of the papermaking apparatus 4. Furthermore, the ejecting parts 17a to 17e are disposed so as to eject the particle-containing liquid onto the belt-like (elongated) paper stock 30 adhered to, for example, the circumferential surface of the Yankee drum 52.

The ejecting parts 17a to 17e of the papermaking apparatus 4 are arranged, for example, in a line as shown in FIG. 2 or 3, with respect to the belt-like paper stock 30 deposited on the circumferential surface of the Yankee drum 52, and the ejection control unit of the papermaking apparatus 4 controls the operation of the ejecting parts 17a to 17e in the same way as the ejection operation of the papermaking apparatus 1 or the like, which has been described using FIGS. 2 and 3, to allow the particle-containing liquid to be ejected from the ejecting parts 17a to 17e.

Note that the particle-containing liquid used in the papermaking apparatus 4 is the same as that used in the papermaking apparatus 1 or the like.

As the Yankee drum 52 rotates, the paper stock 30 on which the particle-containing liquid is deposited as described above moves to the position where the scraper 54 is disposed. While moving, the paper stock 30 is made into completely dry belt-like thin paper by the Yankee drum 52. This belt-like thin paper is peeled off from the Yankee drum 52 by the scraper 54 and is formed into the deodorant rolled paper 23 by the winding rollers 21, the winding pressure roller 22, and the like.

As described above, in the papermaking apparatuses 1 to 4, because the particle-containing liquid is ejected from the ejecting parts 17a to 17e and is deposited on the deposition areas a1 to d1 or the deposition areas a2 to d2 of the paper stock 30, when the paper stock 30 is formed into thin paper, it is easy to appropriately and precisely control the amount of deodorant carbon particles or the like contained in the thin paper.

Furthermore, because it is easy to allow the deodorant carbon or the like to be deposited on the entire thin paper surface without concentration unevenness, it is possible to obtain equal deodorant effect at all portions of the thin paper, thus stabilizing the quality and improving the reliability.

Furthermore, because the particle-containing liquid is ejected from the plurality of ejecting parts 17a to 17e onto the paper stock 30 with a predetermined time difference, it is possible to prevent the occurrence of local tearing or a split portion in the middle of the elongated shape when the paper stock 30 is formed into a thin paper shape.

REFERENCE SIGNS LIST 1 to 4 papermaking apparatus
10 pulp-material feeding unit
11 paper-stock defibration unit
12 white water pit
13 screen part
14 inlet
15, 15a, 15b, 55 roller
16 wire cloth
17a to 17e ejecting part
18 suction box
19 couch roller
20, 20a, 20b press roller
21 winding roller
22 winding pressure roller
23 deodorant rolled paper
30 paper stock
40 papermaking tank
41 paper stock liquid
42 cylindrical cylinder
43 couch roller
44, 50 wet felt
51 dry felt
52 Yankee drum
53 pressure roller
54 scraper

The invention claimed is:

1. A deodorant-paper manufacturing method comprising:
a first step in which paper stock in the form of a belt that is made into paper and placed or deposited on conveyance means in a wire part is dehydrated;
a second step in which the paper in the form of a belt dehydrated in the first step is transferred to conveyance means in a press part to be further dehydrated; and
a third step in which the paper in the form of a belt dehydrated in the second step is dried by drying means in a dryer part, wherein
any one of the first, second, and third steps includes a fourth step in which liquid containing particles having deodorant effect is ejected from a plurality of ejecting parts, and,
in the fourth step, the plurality of ejecting parts are arranged in a line such that the particle-containing liquid is deposited in a width direction of the paper stock or paper in the form of a belt, and
the particle-containing liquid is sequentially ejected from the respective ejecting parts with a predetermined time difference between ejections, moisture in the particle-containing liquid is soaked to be diffused into fibers in the paper stock or the paper, and due to the soaking of the particle-containing liquid, the particle-containing liquid diffuses through the fibers and unevenness in or damage to fibers in the paper stock does not occur.

2. The deodorant-paper manufacturing method according to claim 1, wherein, in the fourth step, the particle-containing liquid is ejected sequentially from the ejecting part disposed at one end in the width direction of the paper stock or the paper toward the ejecting part disposed at the other end in the width direction of the paper stock or the paper.

3. The deodorant-paper manufacturing method according to claim 2, wherein, in the first step, the paper stock is discharged from an inlet part onto a continuous mesh, serving as the conveyance means in the wire part, to make paper.

4. The deodorant-paper manufacturing method according to claim 2, wherein, in the first step, the paper stock in a papermaking tank is formed into paper onto the conveyance means in the wire part by a cylinder mold.

5. The deodorant-paper manufacturing method according to claim 1, wherein, in the fourth step, the particle-containing liquid is ejected sequentially from the ejecting part disposed at a central portion in the width direction of the paper stock or the paper toward the ejecting parts disposed at both ends in the width direction of the paper stock or the paper.

6. The deodorant-paper manufacturing method according to claim 5, wherein, in the first step, the paper stock is discharged from an inlet part onto a continuous mesh, serving as the conveyance means in the wire part, to make paper.

7. The deodorant-paper manufacturing method according to claim 5, wherein, in the first step, the paper stock in a papermaking tank is formed into paper onto the conveyance means in the wire part by a cylinder mold.

8. The deodorant-paper manufacturing method according to claim 1, wherein, in the fourth step, the particle-containing liquid is ejected sequentially from the ejecting parts disposed at both ends in the width direction of the paper stock or the paper toward the ejecting part disposed at the central portion in the width direction of the paper stock or the paper.

9. The deodorant-paper manufacturing method according to claim 8, wherein, in the first step, the paper stock is discharged from an inlet part onto a continuous mesh, serving as the conveyance means in the wire part, to make paper.

10. The deodorant-paper manufacturing method according to claim 9, wherein, in the first step, the paper stock in a papermaking tank is formed into paper onto the conveyance means in the wire part by a cylinder mold.

11. The deodorant-paper manufacturing method according to claim 1, wherein, in the first step, the paper stock is discharged from an inlet part onto a continuous mesh, serving as the conveyance means in the wire part, to make paper.

12. The deodorant-paper manufacturing method according to claim 1, wherein, in the first step, the paper stock in a papermaking tank is formed into paper onto the conveyance means in the wire part by a cylinder mold.

\* \* \* \* \*